United States Patent [19]

Sugimori et al.

[11] Patent Number: 4,985,771
[45] Date of Patent: Jan. 15, 1991

[54] ANTI-RINGING DEVICE FOR TELEVISION TRANSMISSION SYSTEM

[75] Inventors: Yoshio Sugimori; Yoshihide Kimata; Tadao Kurosaki; Joji Urano, all of Tokyo, Japan

[73] Assignee: Nippon Television Network Corporation, Tokyo, Japan

[21] Appl. No.: 281,368

[22] Filed: Dec. 8, 1988

[30] Foreign Application Priority Data

Dec. 31, 1987 [JP] Japan .............................. 62-335048

[51] Int. Cl.$^5$ .............................................. H04N 5/14
[52] U.S. Cl. ....................................... 358/160; 358/167
[58] Field of Search ...................... 358/167, 37, 36, 31, 358/160

[56] References Cited

U.S. PATENT DOCUMENTS 3,333,055  7/1967  Krause ................................ 358/167
4,130,805 12/1978  Mori et al. .......................... 358/167
4,597,007  6/1986  Reitmeier et al. .................... 558/36

Primary Examiner—James J. Groody
Assistant Examiner—David E. Harvey
Attorney, Agent, or Firm—Sughrue, Mion, Zinn, Macpeak and Seas

[57] ABSTRACT

An anti-ringing device for a television signal transmission system in which the frequency band of a luminance component of a video signal from an image device is limited to prevent visible ringing at the receiver. The device includes a signal delay circuit 2 for delaying the video signal obtained by the image device, a low-pass filter 3 capable of changing the frequency band limitation characteristics thereof, a discriminator 4 for providing an output when the luminance component of the video signal contains a source of ringing, and a switch 5 for normally connecting the output of the delay circuit to a signal processor 6. The switch is responsive to the output of the discriminator for connecting the low-pass filter to the signal processor instead of the delay circuit, whose delay time corresponds to the signal processing time required in the discriminator.

5 Claims, 3 Drawing Sheets

FIG. 1
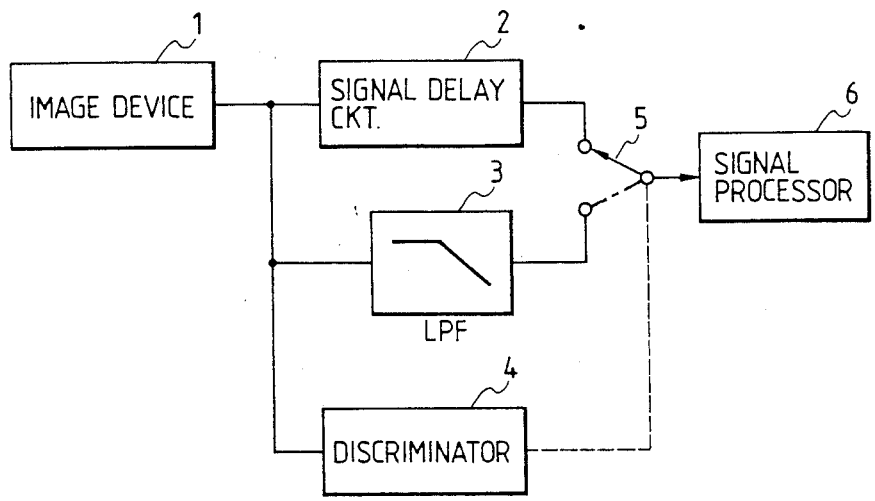
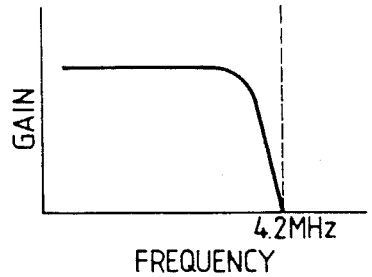
FIG. 3B
PRIOR ART
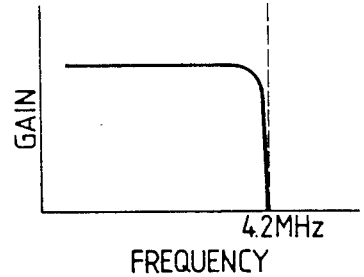
FIG. 3A
PRIOR ART

ANTI-RINGING DEVICE FOR TELEVISION TRANSMISSION SYSTEM

BACKGROUND OF THE INVENTION

The present invention relates to an anti-ringing device for a television signal transmission system and, particularly, to such a device capable of changing the band limiting characteristics thereof with respect to a luminance component of a video signal to prevent ringing from occuring during reception of the video signal.

In a television transmission signal in the NTSC system, a band limitation is performed for a luminance signal. That is, when a video signal obtained by a high resolution camera is received, ringing may be produced in various areas on a screen. Therefore, it is desired to limit the band preliminarily in a transmission system such that the production of such ringing is prevented and to prevent the resolution from being degraded. The term "ringing" used in this description means a local change of an image on a screen caused by an abrupt change of luminance due to the high frequency cutoff characteristics of a transmission line. That is, the ringing on the image screen takes the form of thin white or black contour lines surrounding a portion of a picture on the screen. Therefore, such ringing may or may not be conspicuous depending upon the relation of the picture portion to the background thereof. For example, when the picture portion is a thin tower with a blue sky as the background, the ringing can not be ignored. However, when the background thereof is woods, it may be ignored.

In the NTSC television signal transmission system, the frequency band of the luminance signal is limited to 4.2 MHz, and the color signal frequency bands for the I signal and the Q signal are limited to 1.5 MHz and 0.5 MHz, respectively. Further, a reference sub-carrier frequency of 3.58 MHz is mixed thereto and a resultant signal is fed to a transmitter. Thus, a video signal obtained from an image device is band-limited by passing it through a low-pass filter and then fed to the transmission system which may include a signal recording device such as a VTR.

Conventional low-pass filters used to limit the luminance signal frequency band have such characteristics as shown in FIGS. 3A and 3B, in which FIG. 3A is a usual low pass filter designed to improve image quality and FIG. 3B is a filter designed to remove ringing. In FIG. 3A, the characteristic is substantially flat up to a frequency of 4.2 MHz which is very close to an upper frequency limitation of the frequency band, and has a sharp cutoff above 4.2 MHz. Therefore, the amplitude limitation of the luminance signal in a high frequency region of the video signal from the image device is small, and thus the image on the screen becomes sharp. When a high resolution camera is used as the image device on the transmission side, signal component up to 6 to 7 MHz can be obtained, and ringing is produced at various points on the screen.

On the other hand, in FIG. 3B, the characteristic slopes down gradually at frequencies higher than, for example, 3 MHz. It has been found that, with such a filter, the production of ringing is minimized. However, since the amplitude of the 4 MHz signal is reduced, blurring of the whole image occurs due to degradation of resolution.

The sharpness of the image on a screen is thus contradictory to the conspicuousness of ringing, and it is very difficult to make both of them optimum.

SUMMARY OF THE INVENTION

An object of the present invention is to provide a transmission system having a characteristic with which ringing may be ignored without a sacrifice of image sharpness.

According to the present invention, a video signal is checked as to whether or not there is a condition or conditions therein under which ringing becomes conspicuous visually, and a transmission band is automatically controlled thereby to make ringing not conspicuous. That is, a discrimination circuit detects signal components in a luminance signal of a video signal containing ringing and a circuit capable of changing the band limitation characteristic is selectively inserted into the transmission system according to the output of the discrimination circuit.

BRIEF DESCRIPTION OF THE DRAWING

FIG. 1 is a block circuit diagram showing a basic construction of the present invention;

DETAILED DESCRIPTION OF THE PREFERRED EMBODIMENT

Figure 2:
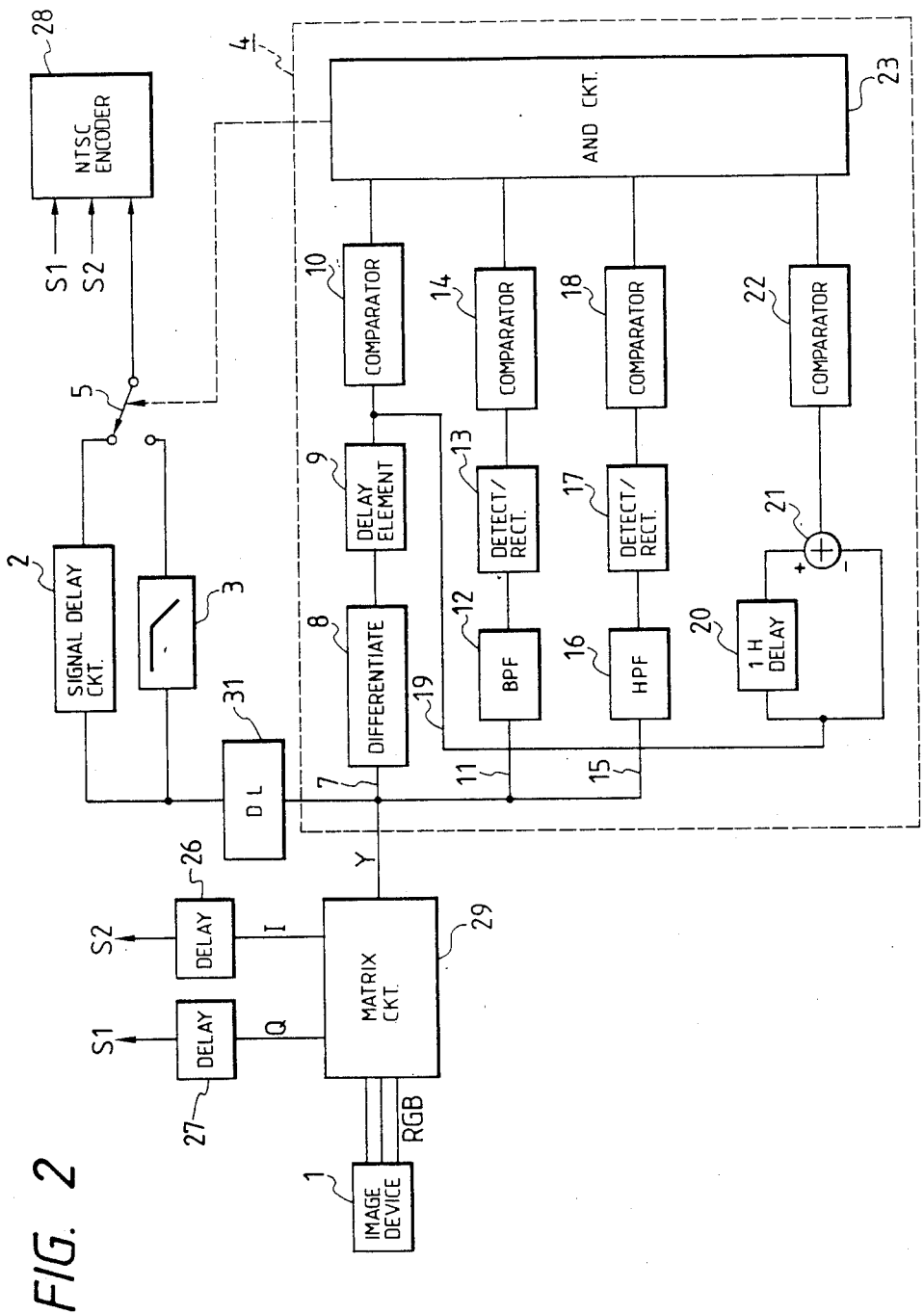
FIG. 2 is a block circuit diagram of a discrimination circuit shown in FIG. 1.
Figure 3:
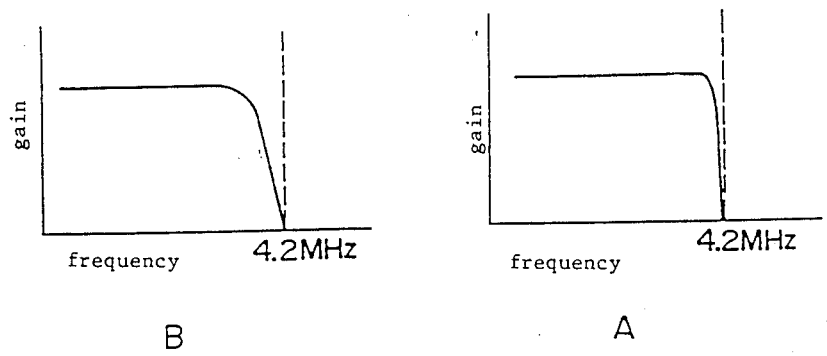
FIGS. 3A and 3B are characteristic curves of conventional filters used in a conventional television signal transmission system.

In FIG. 1 which shows a basic construction of the present invention, a video signal from an image device 1 is supplied to inputs of a delay circuit 2, a low-pass filter 3 whose characteristic slopes down gradually, and a discrimination circuit 4, all of which are connected in parallel to each other. Outputs of the delay circuit 2 and the low-pass filter 3 are connected to a switch 5 which is controlled by an output signal of the discrimination circuit 4 to pass either of the output signals of the delay circuit 2 and the low-pass filter 3 to a signal processor 6.

The low-pass filter 3 is capable of changing the band limitation characteristics thereof and the discrimination circuit 4 functions to continuously check the luminance signal of the video signal as to whether or not it contains prominent ringing, and provides an output signal only when it detects a signal containing ringing.

The switch 5 is normally in the position shown in FIG. 1 and supplies the video signal to the signal processor 6 with a time delay given by the delay circuit 2 which corresponds to the discrimination time of the discrimination circuit 4. When the discrimination circuit 4 provides an output signal to the switch 5, the latter is switched to the position shown by the chain line to supply an output from the filter 3 to the signal processor 6.

FIG. 2 shows details of the discrimination circuit 4 together with other components of the present invention shown in FIG. 1, in which the signal processor 6 takes the form of an NTSC encoder 28. In FIG. 2, the discrimination circuit path 4 includes a circuit 7 for detecting a level change of a video signal, a circuit path 11 for detecting a background component thereof, a circuit path 15 for checking frequency components by which ringing may be produced, and a circuit path 19 for checking the correlation of signals in the vertical direction of an image.

The circuit 7 includes a series circuit path of a differentiation circuit 8, a delay element 9 and a comparator 10 which provides an output when an input thereof from the delay element 9 is larger than a constant value preset therein.

The circuit path 11 includes a series connection of a band-pass filter 12 having a pass band of about 1 to 3 MHz, a detecting and rectifying circuit 13 and a comparator 14 which provides an output when an input thereof from the detecting and rectifying circuit 13 is smaller than a constant value preset therein.

The circuit path 15 includes a series connection of a high-pass filter 16 having a lower frequency limit of about 4 MHz, a detecting and rectifying circuit 17 and a comparator 18.

The circuit path 19 includes a 1H delay circuit 20 for introducing a delay of 1 scan line, an adder 21 for adding the output of the delay element 9 of the circuit path 7 delayed by 1H by the delay circuit 20 and the same output inverted in phase, and a comparator 22 which provides an output only when the output of the adder 21 is zero.

Outputs of the comparators 10, 14, 18 and 22 are connected to an AND circuit 23. The circuit path 19 is connected between a junction between the delay element 9 and the comparator 10 of the circuit 7 and the AND circuit path 23, whose output is used to control the switch 5 connected to the encoder 28.

Three color signals R, G and B obtained by the image device 1 are supplied to a matrix circuit 29 to obtain a luminance signal Y and color signals I and Q. The I and Q signals are applied through delay elements 26 and 27 to the NTSC encoder 28, respectively. On the other hand, the luminance signal Y is supplied to the circuit paths 7, 11 and 15 and a delay element 31. The output of the delay element 31 is supplied through the signal delay circuit 2 and the low-pass filter 3, whose characteristic slopes down gradually, to the switch 5 which is normally in the shown position.

In the circuit path 7, the differentiator 8 differentiates the luminance signal Y to obtain a signal indicative of a variation of luminance the signal level, which is one source of ringing. The signal obtained by the differentiator 8 is delayed by the delay element 9 and supplied to the comparator 10 which provides an output when the signal level is changed considerably.

In the circuit path 11, the band-pass filter 12 allows signal components of the luminance signal Y corresponding to details of the image, which lie in the range from 1 to 3 MHz and constitute the background of the image, to pass through. Such components are rectified by the detecting and rectifying circuit 13 and supplied to the comparator 14 which provides an output only when there is no such signal components supplied thereto.

In the circuit path 15, the high-pass filter 16 allows frequency components of the luminance signal Y from which ringing may be produced to pass therethrough. Such components are rectified by the detecting and rectifying circuit 17 and supplied to the comparator 18, which provides an output only when the input thereof is larger than the preset value thereof.

The circuit path 19 is provided to detect the correlation of signals concerned with information in a vertical direction of the image. That is, when the signal has a high correlation to the vertical direction of the image, i.e., the signal corresponds to a vertical line, the output of signal adder 21 is cancelled out. The comparator 22 provides an output when there is no input thereto.

Thus, when a considerable level change of the luminance signal Y is detected by the circuit path 7, no intermediate frequency component indicative of details of the video signal is detected by the circuit path 11, ringing a frequency component in the video signal is detected by the circuit path 15 and a high vertical correlation component is detected by the circuit path 19, the AND circuit 23 provides an output by which the switch 5 is operated to supply the output of the low-pass filter 3 to the NTSC encoder 28.

As described, since, in the present invention, the transmission signal is processed in the transmission system, it is possible on the receiver side to prevent prominent ringing on the screen without degrading the resolution. With the automatic band limitation for the transmission signal, according to the present invention, it is possible to maintain the quality of the received image high without an exchange of filters even when a high resolution camera is used as the image device.

What is claimed is:

1. An anti-ringing device for use in a television signal transmission system, comprising signal delay means for delaying a video signal obtained by an image device, a low-pass filter for changing a frequency band limitation characteristic of said transmission system, discrimination means for providing an output when a signal component of the video signal forming a source of ringing is detected thereby, and switch means for connecting an output of said signal delay means to a signal processor in a first, normal position and responsive to said output of said discrimination means for connecting said low-pass filter to said signal processor, instead of said delay means, in a second position, said delay means having a delay time corresponding to a signal processing time required in said discrimination means, wherein said discrimination means comprises first means for detecting a predetermined level change of a luminance signal of the video signal, second means for detecting an absence of intermediate frequency components indicative of details of the video signal, third means for detecting a ringing frequency component in the video signal, fourth means for detecting a high vertical correlation component of the luminance signal and an AND circuit responsive to outputs of said first, second, third and fourth means to provide an output for controlling said switch means to supply the output of said low-pass filter to said signal processor.

2. The anti-ringing device as claimed in claim 1, wherein said first means comprises differentiation means, a delay element connected in series with said differentiation means and a comparator having a predetermined first reference value and providing an output when an output of said delay element exceeds said predetermined first reference value.

3. The anti-ringing device as claimed in claim 2, wherein said second means comprises a band-pass filter, a first detecting and rectifying circuit connected in series with said band-pass filter and a comparator having a second predetermined reference value and providing an output when an output of said first detecting and rectifying circuit is smaller than said second predetermined reference value.

4. The anti-ringing device as claimed in claim 3, wherein said third means comprises a high-pass filter, a second detecting and rectifying circuit connected in series with said high-pass filter and a comparator having a third predetermined reference value and providing an output only when an output of said second detecting and rectifying circuit is larger than said third predetermined reference value.

5. The anti-ringing device as claimed in claim 4, wherein said fourth means comprises further delay means for delaying said output of said delay element of said first means, an adder for subtracting an output of said further delay means from said output of said delay element of said first means and a comparator having a fourth predetermined reference value and providing an output only when an output of said adder is zero.

* * * * *